(12) United States Patent
Franken et al.

(10) Patent No.: US 9,429,911 B2
(45) Date of Patent: Aug. 30, 2016

(54) OBJECT PRODUCED BY A MOLDING PROCESS AND MARKED BY A DIFFRACTION GRATING, AND METHOD FOR THE PRODUCTION THEREOF

(75) Inventors: Klaus Franken, Igis (CH); Alfred Rutz, Trin (CH)

(73) Assignee: U-NICA Technology AG, Malans (CH)

( * ) Notice: Subject to any disclaimer, the term of this patent is extended or adjusted under 35 U.S.C. 154(b) by 932 days.

(21) Appl. No.: 13/642,215

(22) PCT Filed: Apr. 4, 2011

(86) PCT No.: PCT/EP2011/055196
§ 371 (c)(1),
(2), (4) Date: Oct. 19, 2012

(87) PCT Pub. No.: WO2011/131475
PCT Pub. Date: Oct. 27, 2011

(65) Prior Publication Data
US 2013/0038936 A1   Feb. 14, 2013

(30) Foreign Application Priority Data
Apr. 22, 2010   (CH) ...................... 0579/10

(51) Int. Cl.
*G03H 1/02*   (2006.01)
*G03H 1/00*   (2006.01)
(Continued)

(52) U.S. Cl.
CPC ........... *G03H 1/0236* (2013.01); *B29C 45/372* (2013.01); *B29C 37/0053* (2013.01);
(Continued)

(58) Field of Classification Search
CPC ........ G02B 1/04; G02B 5/18; G02B 5/1098; G02B 5/1814; G02B 5/1819; G02B 5/1823; G02B 5/1842; G02B 5/1861; G02B 5/1866; G02B 5/1871; G02B 5/1876; G02B 5/188; G02B 5/1885; G03H 1/0005; G03H 1/02; G03H 1/04; G03H 1/08; G03H 1/0011; G03H 1/0236; G03H 1/0244; G03H 2001/0027; G03H 2001/0033; B29C 45/372; B29C 37/0053; B29K 2027/06

USPC .......................... 359/2, 567, 575; 283/85–86
See application file for complete search history.

(56) References Cited

U.S. PATENT DOCUMENTS

| 1,354,471 A | 10/1920 | Doner |
| 5,071,597 A | 12/1991 | D'Amato et al. |

(Continued)

FOREIGN PATENT DOCUMENTS

| GB | 2 417 460 A | 3/2006 |
| JP | 2007133355 A | 5/2007 |

(Continued)

OTHER PUBLICATIONS

Communication dated Oct. 31, 2014 from the State Intellectual Property Office of the People's Republic of China in counterpart Chinese Patent Application No. 201180020317.6.

(Continued)

*Primary Examiner* — Kimberly N Kakalec
(74) *Attorney, Agent, or Firm* — Sughrue Mion, PLLC

(57) ABSTRACT

The invention relates to a method for marking an object (1) during the production thereof, comprising the molding of at least one grating structure (10) on or in the surface of the object (1). To this end, said grating structure has a grating constant which permits observation by the naked eye of the diffraction structures which can be generated by visible light. The at least one grating structure (10) is generated by a molding process of the object (1), in which the mold used is equipped with a negative version of said grating structure. The object (1) at least partially consists of a soft polymer, in particular PVC-P, wherein the molding process is carried out as an injection molding process using an open mold. To this end, as a result of the injection molding process, the grating structure (10) comprises at least two regions (21, 22, 23), wherein the respective grating lines (31, 32, 33) of different regions (21, 22, 23) are phase-shifted and/or angularly displaced in relation to each other and the diffraction pattern is partially canceled so that the diffraction structures can be recognized by the naked eye only with suitable lighting.

8 Claims, 3 Drawing Sheets

(51) Int. Cl.
*B29C 45/37* (2006.01)
*B29C 37/00* (2006.01)
*B29K 27/06* (2006.01)

(52) U.S. Cl.
CPC ......... *B29K2027/06* (2013.01); *G03H 1/0011* (2013.01); *G03H 2001/0284* (2013.01); *G03H 2270/52* (2013.01)

(56) References Cited

U.S. PATENT DOCUMENTS

| | | | |
|---|---|---|---|
| 5,189,531 A | 2/1993 | Palmer et al. | |
| 6,088,161 A * | 7/2000 | Lee | B42D 25/328 359/2 |
| 6,369,919 B1 * | 4/2002 | Drinkwater | G03H 1/265 283/86 |
| 2004/0187997 A1 | 9/2004 | Paturle et al. | |
| 2007/0053028 A1 * | 3/2007 | Ezra | G02B 5/1861 359/2 |
| 2007/0166519 A1 * | 7/2007 | Bi | B41M 3/14 428/204 |
| 2008/0272883 A1 * | 11/2008 | Toda | G02B 5/1809 340/5.8 |

FOREIGN PATENT DOCUMENTS

| | | |
|---|---|---|
| WO | 98/14805 A1 | 4/1998 |
| WO | 2004/009336 A1 | 1/2004 |
| WO | 2006/027688 A1 | 3/2006 |

OTHER PUBLICATIONS

International Search Report for PCT/EP2011/055196 dated May 18, 2011.

* cited by examiner

OBJECT PRODUCED BY A MOLDING PROCESS AND MARKED BY A DIFFRACTION GRATING, AND METHOD FOR THE PRODUCTION THEREOF

TECHNICAL DOMAIN

The present invention relates to a marked object produced by a moulding process, whereby the marking has a grating structure on or in its surface, whereby the grating structure has a grating constant which on illumination of the grating structure with light visible to the human eye generates a diffraction structure.

PRIOR ART

From WO 2006/027688 a method of producing tablets on which a visible diffraction structure is incorporated is known. If the diffraction microstructure of the object is illuminated with white light it shows a rainbow effect similar to a hologram. This optical effect can indicate the authenticity of the tablet. The microstructures are grating structures with a spacing of 500 nanometres to a few micrometres. The method is solely aimed at the pressing of tablets in the pharmaceutical sector is not applicable for general purposes.

An object with the features of the introductory section of claim 1 is known from US 2004/0187997 in which a decorative element is applied to a rubber tyre. The decorative element comprises various macroscopic areas each with dimensions of square centimetres and a grating structure arranged at different angles with regard to each other. For an observer in natural light this produces a motif composed of differently scattering and reflecting elements. The grating constant is given as preferably 0.5 to 0.7 micrometres with a motif height of between 0.1 and 0.3 micrometres. These parameters allow clear recognition of a motif which is heightened by the different macroscopic areas with different orientations of the individually identifiable grating structures.

DESCRIPTION OF THE INVENTION

On the basis of this prior art, the object of the invention is to provide a marked object and a method of producing a diffractive optical security feature for objects made of plastic.

More particularly it is a further aim of the invention that a not directly visible security element is present, whereby not directly visible means that the human can only see the feature in bright light such as sunlight or in a relatively bundled light beam for example.

In accordance with the invention this is achieved by the features of claim 1 in that the grating structure comprises at least two regions, wherein the respective grating lines of different regions are phase-shifted or angularly displaced in relation to each other.

A marked object produce by a moulding process is thus disclosed, wherein the marking exhibits a grating structure on or in its surface, whereby the grating structure has a grating constant which on illumination of the grating structure with light visible to the human generates a diffraction structure. With this grating structure either different diffraction structures are generated, or on the surface there regions with and regions without diffraction structures, which together form an optically recognisable symbol. The individual, more particularly macroscopic elements of the optically identifiable symbol are divided into a multiplicity of, more particularly, microscopic regions, wherein the respective grating lines of different regions are phase-shifted and/or angularly displaced in relation to each other.

Thus, in normal light the microscopic elements which are phase-shifted and/or angularly displaced in relation to each other optically cancel each other out for the observer and the element of the optical symbol is no longer recognisable. However, in appropriately brighter light these individual regions can be recognised so that (each) macroscopic partial element of the logo or the marking, and thereby the symbol as such, becomes recognisable again.

An advantage of invention consists in the fact that the security feature can be checked by a consumer with the naked eye in conditions usually achievable at the point of sale of the object. On the other hand the security feature is not obtrusive, as the hologram is not visible in normal diffuse room light.

In an advantageous embodiment of the invention the regions set out in the claims are microscopic and are not macroscopically visible to the observer, particularly in normal diffuse room light, and only become visible using a strong light source, such as halogen lamp, a powerful LED lamp or also direct sunlight.

Above all, but not exclusively this verifiability is seen in the case of a newly, for example originally, packaged item. Once the item has been used and thereby contaminated, the structures of the security element become clogged, by grease or dust for example. Through cleaning the structure can be exposed again and made visible by way of said lighting. In this way the authenticity can also be confirmed at a later stage.

It is surprising that a soft polymer with a high shrinkage volume allows reproduction of the security feature in the form of a moulded grating. Due to the existence of the shrinkage volume individual grating regions are moulded which different grating line orientations or spacings and thus generate diffraction structures which partially cancel each other out. Preferably the object is at least partially made of a soft polymer, more particularly of PVC-P, wherein the moulding process is an injection moulding process and the grating structure is present in the surface of the soft polymer. For this a material with a shrinkage volume of at least 1% is used and/or the material is granular with granules in the range of the grating constant.

Advantageously, in the marked object a grating constant of the granting structure of between 200 nanometres and 5 micrometres, preferably between 500 and 1200 nanometres is used.

The invention also relates to a method with the features of claim 6 with which an object in accordance with the invention can be produced.

The method for marking an object during its production comprises the moulding of a grating structure on or in the surface of the object, wherein the marking has a grating structure with a grating constant which on illumination of the grating structure with light visible to the human eye generates a diffraction structure. The grating structure is produced by a moulding process and results in either different diffraction structures, or regions on the surface with and regions without diffraction structures, which together form an optically recognisable symbol. In doing so the mould used in the moulding process is equipped with a negative version of said grating structures. When moulding the grating structure in the surface of the object in the at least individual, more particularly macroscopic regions of the optically recognisable symbol, these individual elements of the optically recognisable symbol are divided into a large number of, more particularly, microscopic regions, wherein the grating lines of various regions are phase-shifted and/or angularly displaced in relation to each other.

The large number of hundreds to thousands of regions of the individual logo components then cancel each other out in normal lighting and are only visible in suitable, in particular, more powerful and/or directed light.

Further forms of embodiment are set out in the dependent claims.

BRIEF DESCRIPTION OF THE DRAWINGS

Preferred forms of embodiment of the invention will be described below with the aid of the drawings which are for explanatory purposes only and should not be considered as restrictive. In the drawings.

DESCRIPTION OF PREFERRED FORMS OF EMBODIMENT

Figure 1:
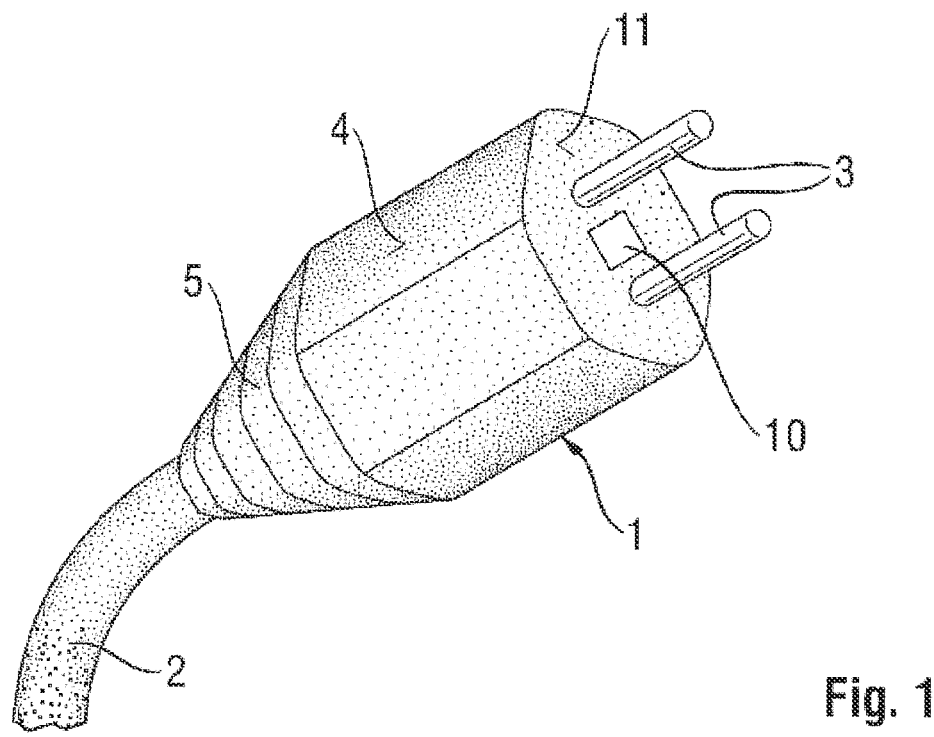
FIG. 1 shows a sketch of power plug as the marked object in accordance with one example of embodiment of the invention.

FIG. 1 shows a schematic sketch of a power plug 1 at the end of a power cable 2 with two contact pins 3 in this case. Normally the plug 1 is produced in an injection moulding process, i.e. in a tool on an injection moulding machine through surrounding the cable 2 and the contact pins 3 with a plastic mass in a single processing step.

The injection moulding process is used for the production of a security feature on an object made of plastic. In the injection moulding process an injection tool, which is not shown in the drawings, is employed. In this injection moulding tool an insert with the holographic structure is placed in the injection mould as a master. If a large area of the object to be moulded is to be provided with the holographic structure, the injection mould can be provided with the negative holographic structure over a correspondingly large area. The diffracting structures can be arranged in a raised or recessed manner. In the normal production process the security feature is produced by taking an impression of the surface structure of the negative master.

It is particularly advantageous, as the method in accordance with the invention makes it possible, to incorporate the diffracting structures in curved surfaces. Curved surface can be parts of spherical surfaces or partially spherical surfaces, or cylindrical surfaces. The surfaces can be curved once, i.e. about one axis, or twice about two axes perpendicular to each other. Such security features are even more difficult to counterfeit.

In the example shown in FIG. 1 here the holographic structure 10 is arranged on the front surface 11 of the plug 1, from which the contact pins 3 project, centrally between these contact pins 3. It is shown as a square but it can of another shape. It can also extend around one or more contact pins 3. It can also be arranged on a curved surface of the plug such as bulged side surfaces 4 of the plug or tapering surfaces 5 at the transition to the cable 2.

The structure 10 is an impression of a negative master which is provided on the injection moulding tool. The negative master is a diffraction structure. A diffraction structure comprises one or more microstructures and gratings. These each contain a large number of linear structures which in the simplest case are straight, parallel and equally spaced. These are ridges or grooves on the surface. These ridges/grooves are at a distance of 200 nanometres to 5 micrometres from each other. This spacing is also known as the grating constant. In particular they advantageously have a spacing of 500 nanometres to 3 micrometres, 500 to 1200 nanometres, and even more preferably between 700 nanometres and 2 micrometres. After removal from the mould they form a reflection grating on the object. Advantageously many of these gratings have a different orientation in order to show a recognisable image of graphic information when illuminated. The grid constants are always in the range between 0.2 and 5 micrometres, which widely allows the diffraction structures to be observed with the naked eye.

In tests the applicant used various masters, for example gratings with an interval of 700 nanometres. In one form of embodiment the structure depth of the grating of a homogenous region in the master was 50 to 600 nanometres, in another master the height of the grating structure was 50 to 400 nanometres.

Advantageously the negative master of the injection mould is made of a hard metal such as steel or a hard-coated metal, for example a metallic multiple-layer structure with an outer hard nickel layer in order to allow a high injection moulding output. Through the low operating pressures it is also possible to provide inserts in the injection moulds which are made of more easily workable materials such a nickel.

The injection moulding process can be carried out with an open mould. An open mould allows injection around chains, ropes or cables. In the injection moulding process with an open mould pressures of 200 to 600 bars are used in contrast to pressures of 800 to 2000 bars in conventional injection moulding processes.

Figure 2:
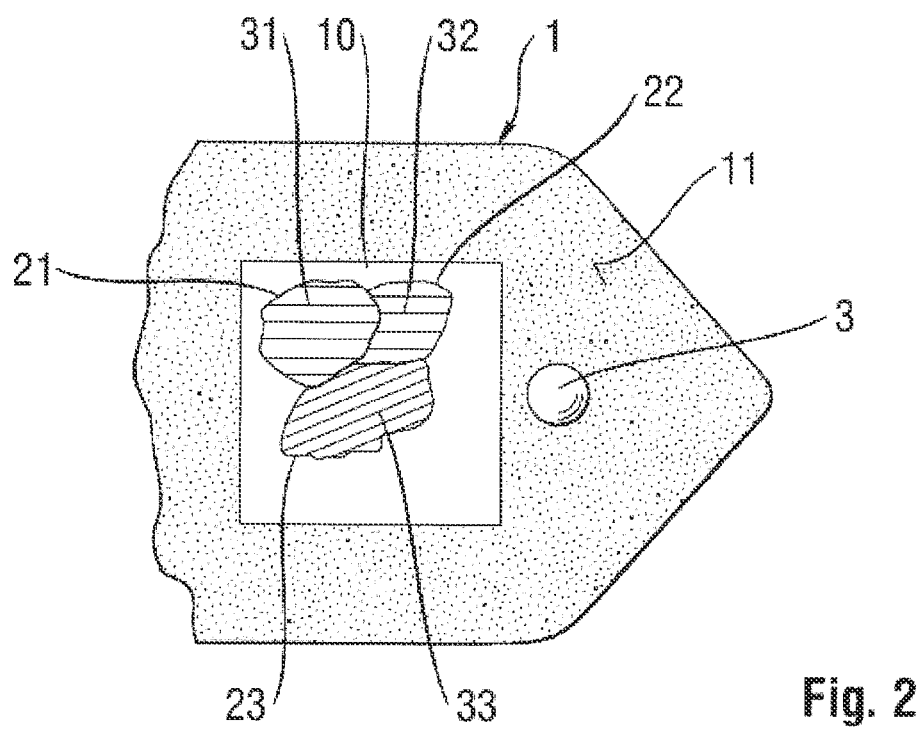
FIG. 2 shows a section of the object with individual grating regions of the marking which are not to scale.

The negative master with a single regular grating structure with a square outer shape in this case generates the diffractive optical security element 10 on the plug 1. FIG. 2 shows a section of this plug 1 with individual grating regions 21, 22 and 23 of the marking, i.e. the structure produced with the negative master. This structure is not even in the same way as the master. Rather, individual grating regions 21, 22 and 23 can be distinguished which exhibit different grating line arrangements. It could be said that the grating structure here has three regions 21, 22 and 23, whereby the respective grating lines 31, 32, 33 of different regions 21 and 22 and 23 are phase-shifted in relation to each other. The grating lines 31, 32 and 33 are for example the raised structures in the surface. The grating lines 31 in region 21 are arranged in parallel and at a determined spacing to each other. They form the diffraction structure in region 21. The same applies to the grating lines 32 in region 22 and the grating lines 33 in region 23. However, a phase-shift of 180 degrees can be seen between grating lines 31 and 32 as the lines end precisely between the lines of the other region.

In contrast the grating lines 33 of region 23 are obliquely displaced with regard to the grating lines of regions 21 and 22, whereby the grating lines of different regions are, more particularly, angularly displaced in relation to each other which results in a weakening of the image resulting from elements of the two regions which in the area of overlapping are also phase-shifted.

Figure 4:
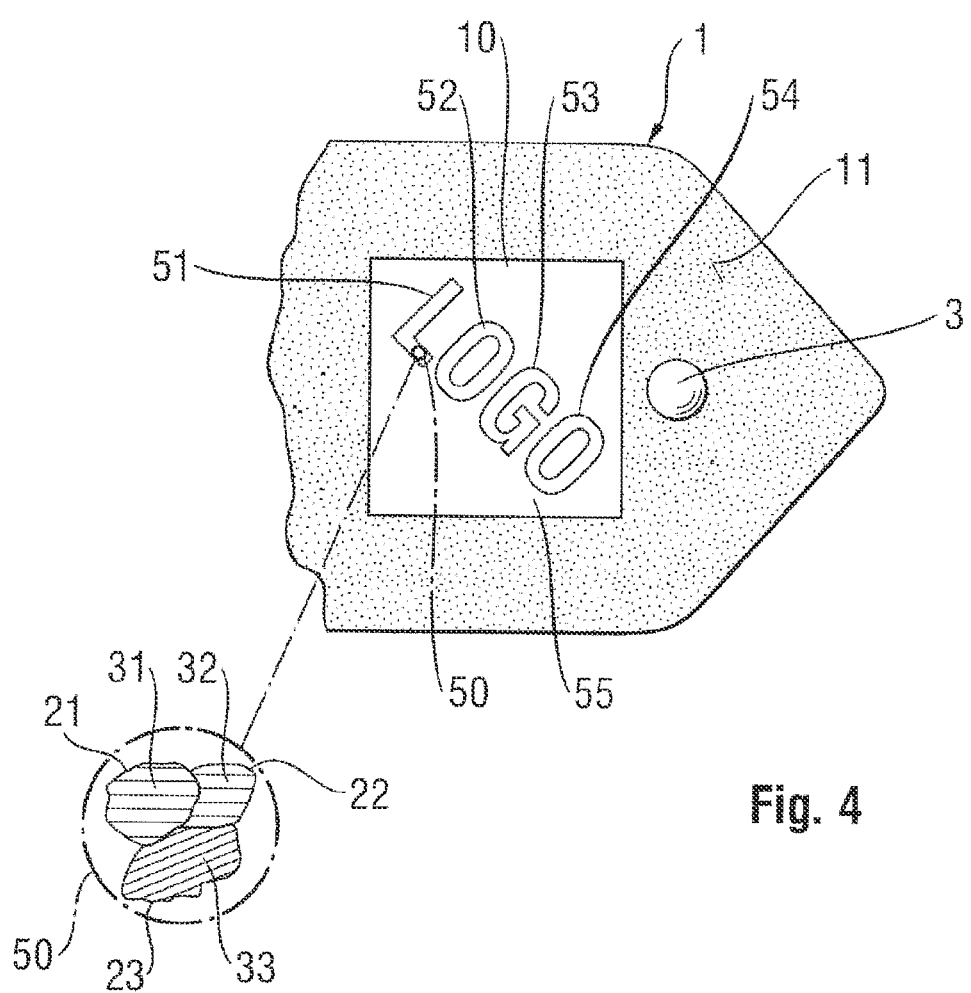
FIG. 4 shows in detail a section of the object with several motif areas and existing grating regions within them.

It now envisaged—in contrast to the prior art US 2004/0187997—that individual, predetermined, differently orientated regions are arranged in the master which when viewed can then be divided into regions 21, 22 and 23 as will explained in the description of FIG. 4. By way of moulding, the different regions 21, 22 and 23 are produced through the master regularly and (for a partial region) having only one homogenous grating region. In tests with the above embodiments of masters (with an interval of 700 nanometres) these regions 21, 22 and 23 have a grating structure interval of around 650 nanometres which can be explained by the shrinkage process. Through this moulding, also including the shrinkage process, individual, differing regions of grating structures are produced on the moulded objects, wherein these differences as such are not visible to the naked eye. Rather, these irregularities in the orientation of the grating structure, which also include serrations and fluctuating ridge heights, result in the grating as such, i.e. regions 21, 22 and 23 seen together, no longer being recognisable to the naked eye in normal light.

Each one of said regions 21 and/or 22 and/or 23 forms a diffraction structure. However, the naked eye looking for the security feature 10 between the contact pins 3 will not see it in weak or unsuitable light as in the image perceived by the eye the diffraction structures cancel each other out. Only in strong lighting conditions is the structure visible, wherein such lighting conditions are present through the use of a powerful light source, such as a halogen lamp or a powerful LED lamp, or also though direct sunlight.

Advantageously the security feature 10 is not a uniform square but a mark with a recognition value, i.e. it either has different diffraction regions or regions with and regions without diffraction structures which form the symbol. A symbol of this type can then comprise the various regions forming a clover leaf in US 2004/0187997 in FIGS. 3 and 4. Within these individual diffraction structures identically orientated in each region, there are these regions 21, 22, 23 which partially cancel each other out, so that the symbol as such cannot then be recognised in normal light.

This can implemented in particular with a soft polymer, more particularly soft PVC. Soft PVC is also known as PVC-P and is a mixture of the polymer and a plasticiser. More generally polymers which have a large shrinkage volume and a low viscosity can be used. More particularly the soft polymer can have a shrinkage volume of at least 1% or at least 5% and/or can be granular.

It is also possible to implement the injection moulding process with an enclosed mould insofar as only low pressures of 200 to 600 bars are used. For this it is necessary to use a polymer basic material of low viscosity. The security feature 10 can, for example, be very simply used on the housing 1 of power cables 2, for example at the front on the plug surface 11 in which the electrical contacts are fastened. Other plugs are plugs of USB cables, cables themselves and all moulded components made of PVC. Additionally, for example, tools of all kinds for which the grip components are injection moulded can be provided with corresponding security features 10, for examples screwdrivers, pliers etc. These also include gardening devices and hoses with a moulded-on flange, thread or bayonet fitting. In particular multi-component housings of electrical devices, for examples, can be provided with a security feature 10 in this manner.

It is possible to provide the entire object or just individual regions and sections with the security feature. Spatially it can be associated with a manufacturer's symbol.

Figure 3:
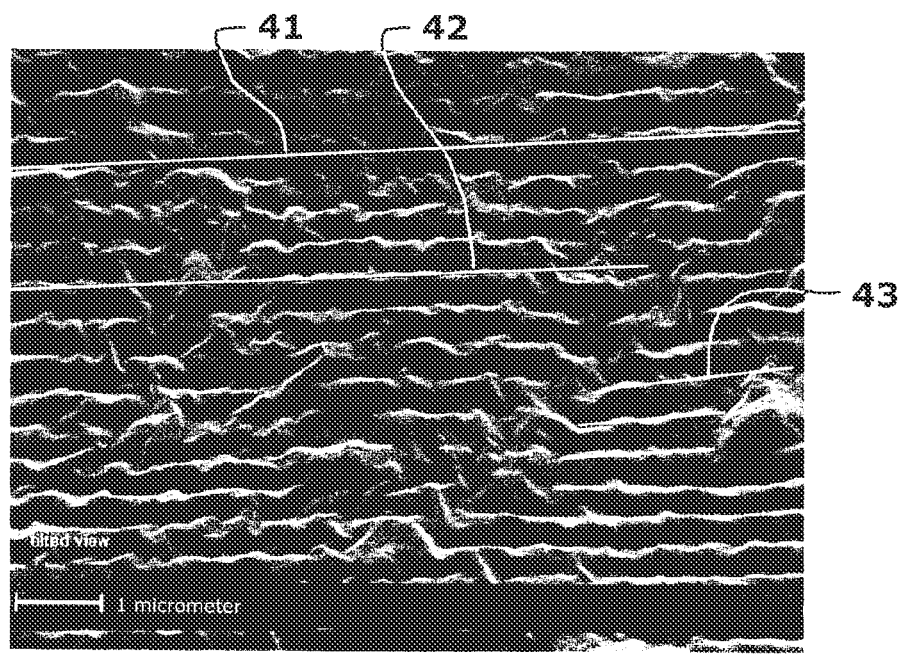
FIG. 3 shows an SEM image with individual grating regions.

FIG. 3 shows an SEM image with individual grating regions. The scale can be seen through the indication of the distance of 1 micrometre. In terms of the profile the grating structure is well moulded. There are a number of grating lines. However, in several regions the lines of the grating are not parallel or in phase. The third line 41, i.e. the third ridge, from the top in the right area of the image is in the left area of image in a valley between two lines, i.e. phase-shifted about 180 degrees. In the right area where it ends a further line marked with number 42 is phase-shifted about 180 degrees. It is of course not necessary that such complete displacement occurs, displacements between 60 and 180 degrees or between 90 and 180 degrees can occur between line groups. The lines in the lower area, of which one is marked 43 for example, are parallel to lines 41 and 42 in the upper area. Macroscopically this corresponds to distortion of the grating lines. The lines which are phase-shifted in relation to each other partially compensate for the diffraction effects so that the security feature, as a so-called concealed feature, is only visible in particular lighting conditions. The individual regions marked by the lines 41, 42, 43 can be of a size of 5 times 5 micrometres.

The reasons for this phase shifting are the shrinkage in the elastomer material (for example at least 1% or at least 5%) and addition to the elastomer material of granular additives which do not shrink, or shrink considerably less that the surrounding elastomer. Simpler visibility would be achievable with less inhomogeneous shrinkage, but for a concealed security feature this is not desirable. It is also sign that this symbol 10 has been produced on the plug 1 with the original injection moulding tool and has not been stamped on afterwards, whereby such quality of the inhomogeneous visibility could not be brought about.

FIG. 4 shows in detail a section of the object 1 with several macroscopic motif areas 51, 52, 53 and 54 and grating regions 21 within these areas 51 to 54. The security feature 10 comprise a basic region 55 and here four different motif regions 51, 52, 53 and 54 which produce the word "Logo". In principle the motif region can also contain image elements, more particularly interconnected image elements. The basic region 55 can also have a grating region. The basic region 55 in this example of embodiment has a surface area of approximately 10 times 10 millimetres from the distance between the plug contacts. However, dimensions of the area 10 are possible from under 5 times 5 millimetres to several square centimetres.

Each individual motif region 51, 52, 53 and 54 and therefore the image as such, is difficult for an observer to see in normal light. This is because the said multiplicity of grating regions 21, 22 and 23 are present in each individual motif region. Here for example, in FIG. 4 in motif region 51, the letter "L", an enlarged region 50 is shown, not to scale, with for example three of a multiplicity of possible several hundred such regions 21, 22, 22 which all together form the symbol, in this case the letter "L". From FIG. 4 through comparing the scale between the plug 1, security feature 10, the letter "L" 51 therein and finally region 50 from this letter "L" it can be seen that this sizes of the individual regions are in a range from, for example 5 times 5 micrometres. Individual regions 21, 22, 23 can have sizes of up to 1 times 1 millimetre. Due to these sizes the individual regions have a scattering effect, but in a single motif region 51, such as the letter L, are small enough to cancel each other out again to an external observer due to interferences. A part of the logo 51 such as the letter L with dimensions on a basic surface of 10 millimetres times 6 millimetres with a "stroke width" of 2 millimetres can then, with a surface of 28 square millimetres, have between less than 100 and 1 million such regions 21, 22, 23. By expanding the grating regions of 100 times 100 micrometres this figure is just under 3000. Of course these details based on a quadratic area are only a rough estimate and are intended as an example. The individual regions 21, 22, 23 have a production-determined shape and can also be very irregular in shape, as can be seen by the not sharply defined transition areas in FIG. 3.

A further application of the invention is to produce an actively distorted diffraction grating in the master which then through shrinkage generates a further impaired diffraction grating in the object 1. This impaired diffraction grating in the object 1 could then only be improved in order to be become visible through the application of a mechanical pressure and thereby inhomogeneous distortion of the security feature region 10.

LIST OF REFERENCES

| | |
|---|---|
| 1. | Object |
| 2. | Cable |
| 3. | Contact pin |
| 4. | Bulged housing |
| 5. | Tapered section |
| 10. | Security feature/grating structure |
| 11. | Surface |
| 21. | One grating region |
| 22. | Another grating region |
| 23. | Further grating region |
| 31. | Grating lines |
| 32. | Grating lines |
| 33. | Grating lines |
| 41. | Line |
| 42. | Line |
| 43. | Line |
| 50. | Enlarged region |
| 51. | Motif region |
| 52. | Motif region |
| 53. | Motif region |
| 54. | Motif region |

The invention claimed is:

1. A marked object produced by a moulding process, wherein the marked object comprises:
   at least partially a soft polymer with additives which do not shrink, wherein the soft polymer has an inhomogeneous shrinkage volume of at least 1%, the inhomogeneous shrinkage being achieved through granular polymer raw material as additives which do not shrink in the shrinking soft polymer, and
   a marking,
   wherein the marking comprises a surface and has a grating structure on or in this surface,
   wherein the marking comprises several partial regions of the grating structure with which different diffraction structures are generated, which form an optically recognizable symbol,
   whereby the moulding process is an injection moulding process with a master and the grating structure is present in the surface of the soft polymer,
   wherein the grating structure of the marked object comprises grating lines and wherein the grating structure of the marked object has through the moulding deviation due to the inhomogeneous shrinkage in the granular soft polymer at least two regions,
   whereby the grating structure has a grating constant which on illumination of the grating structure with light visible to the human eye generates a diffraction structure comprising the grating lines,
   wherein the grating lines moulded from the master grating lines of different regions of the marked object are phase-shifted and/or angularly displaced in relation to each other, such that the grating lines are not visible to the observer in normal diffuse light conditions.

2. The marked object according to claim 1, wherein the soft polymer is PVC-P.

3. The marked object according to claim 1, wherein the grating constant of the grating structure is between 200 nanometres and 5micrometres.

4. The marked object according to claim 1, wherein the grating constant of the grating structure is between 500 and 1200 nanometres.

5. A marked object produced by a moulding process, wherein the marked object
   comprising at least partially of a soft polymer with additives which do not shrink, wherein the soft polymer has an inhomogeneous shrinkage volume of at least 1%, wherein the inhomogeneous shrinkage is achieved through granular polymer raw material as additives which do not shrink in the shrinking soft polymer, and
   the marked object comprising a marking, wherein the marking comprises a surface and has a grating structure on or in this surface,
   wherein the marking comprises several partial regions of the grating structure which are regions with and regions without diffraction structures, which form an optically recognizable symbol,
   whereby the moulding process is an injection moulding process with a master and the grating structure is present in the surface of the soft polymer,
   wherein the grating structure of the marked object comprise grating lines and wherein the grating structure of the marked object has through the moulding deviation due to the inhomogeneous shrinkage in the granular soft polymer at least two regions,
   whereby the grating structure has a grating constant which on illumination of the grating structure with light visible to the human eye generates a diffraction structure comprising the grating lines,
   wherein the grating lines moulded from the master grating lines of different regions of the marked object are phase-shifted and/or angularly displaced in relation to each other, that these grating lines are not visible to the observer in normal diffuse light conditions.

6. The marked object according to claim 5, wherein the soft polymer is PVC-P.

7. The marked object according to claim 5, wherein the grating constant of the grating structure is between 200 nanometres and 5 micrometres.

8. The marked object according to claim 5, wherein the grating constant of the grating structure is between 500 and 1200 nanometres.

* * * * *